United States Patent Office 3,420,207
Patented Jan. 7, 1969

3,420,207
PNEUMATIC DIAPHRAGM OSCILLATORS
Bengt Lennart Holm, Malmo, Sweden, assignor to Kockums Mekaniska Verkstads Aktiebolag, Malmo, Sweden
Filed Oct. 24, 1966, Ser. No. 589,010
Claims priority, application Sweden, Oct. 27, 1965, 13,863/65
U.S. Cl. 116—142                                    1 Claim
Int. Cl. G10k 9/00

ABSTRACT OF THE DISCLOSURE

A pneumatic diaphragm oscillator has a resonance horn connected to a housing containing the diaphragm and consisting of an intermediate part, an annular closure providing a seal between the horn and the intermediate part, and a cover applied to the end of the intermediate part opposite the horn and biasing the diaphragm against a seat in the intermediate part. The intermediate part has an integral molding consisting of a tubular wall flaring towards one end thereof for forming the seat. A peripheral wall is spaced from and surrounds the tubular wall, and webs are spaced apart around the tubular wall and extend between and integrally interconnect the tubular wall and the peripheral wall.

---

This invention relates to a pneumatic diaphragm oscillator of the type comprising a housing having a detachable cover and forming a chamber with an inlet for a gaseous pressure medium, a resonance horn connected to the housing, and a diaphragm clamped at its periphery in the housing and adapted to control the pressure medium communication between the chamber and the passage in the resonance horn.

The invention has been developed with a view to allowing rational precision manufacture of the housing by compression molding or injection molding or by any other advanced precision manufacturing method into a finished state that does not require subsequent machining of such portions of the housing as are of complicated shape or should have very exact dimensions for ensuring a satisfactory function of the diaphragm oscillator. This makes for simplified manufacture of the diaphragm oscillator and as a consequence reduces the manufacturing costs thereof.

Such simplification and economy of manufacture is realized by the present invention which provides a diaphragm oscillator of the type outlined in the foregoing, in which the housing is made of two separate parts, viz., a lower body to which the resonance horn is connected, and an intermediary body disposed between the lower body and the cover, and in which the chamber is formed at least in part by a number of through openings in the intermediary body which have the one ends closed by the lower body and are arranged around a sleeve-shaped portion constituting an integral part of the intermediary body, said sleeve-shaped portion forming a mushroom-shaped seat for direct coaction with the diaphragm which functions as a movable valve member, and having a through opening communicating with a passage in the resonance horn.

With such a design of the intermediary body, the most complicated part of the diaphragm oscillator housing, it is not difficult at all to compression mold or injection mold the intermediary body because the molding tool or its parts can be withdrawn in opposite directions from the through openings, whereby a favourable material distribution is obtained in the intermediary body and the formation of stresses therein is avoided. Such stresses are detrimental as they may be successively released by the heavy vibrations to which the housing is exposed during sound generation, and can thereby result in cracking of the intermediary body.

The lower body as well as the cover can be designed in such a way as to convey a stiffening effect to the intermediary body, whereby internal stresses possibly occurring therein can be prevented from unfavourably affecting the shape of the intermediary body. This advantage is of particular importance when the intermediary body is made of synthetic plastics, inasmuch as a synthetic plastic which in itself does not possess sufficient rigidity can suitably be exploited in the important element that the intermediary body constitutes.

The invention is of particular advantage in connection with small diaphragm oscillators and ensures good economy in large-series production. The costs of the molds employed will be non-recurrent costs which can be divided onto a great number of produced units, and the cost of significance to each intermediary body produced principally is but the cost of the amount of material required for the intermediary body.

For better elucidation of the invention an embodiment thereof will be described more in detail in the following with reference to the accompanying drawings in which.

Figure 1:
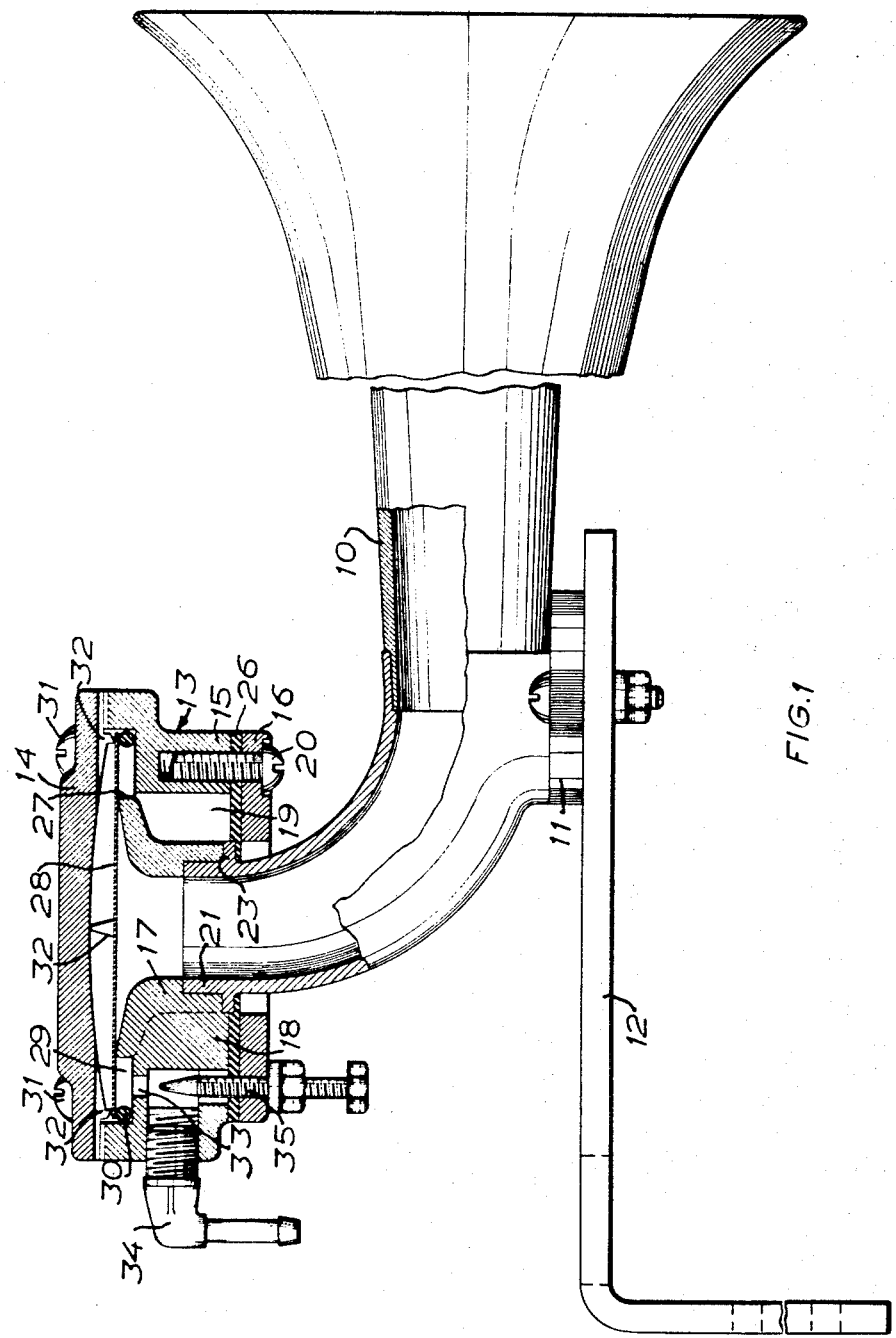
FIGURE 1 is a longitudinal sectional view of a diaphragm oscillator (whistle) according to the invention.
Figure 2:
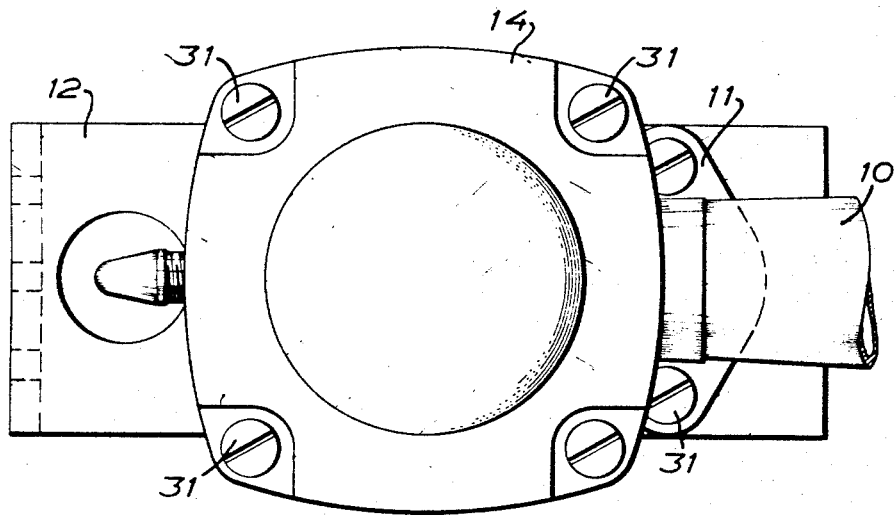
FIGURE 2 is a plan view of the housing of the diaphragm oscillator as seen from the cover side, the resonance horn being but partly shown.

The diaphragm oscillator illustrated in the drawings comprises a resonance horn 10 which is formed with a flange 11 and is secured by means of said flange to a holder in the form of an angular member 12, said resonance horn in turn carrying the remaining diaphragm oscillator, i.e., a diaphragm housing 13 and a cover 14 detachably secured thereto.

Figure 3:
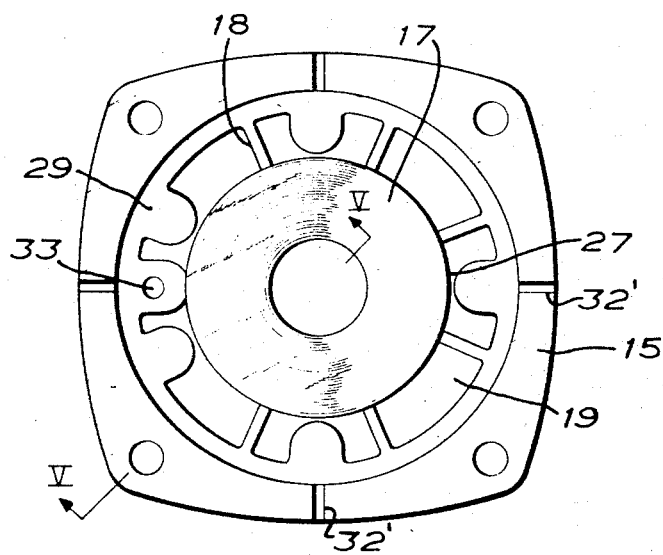
FIGURE 3 is a plan view of the intermediary body as seen from the cover side.
Figure 4:
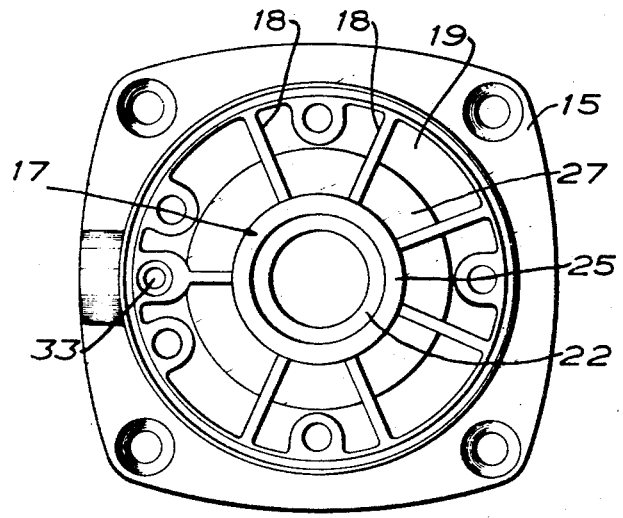
FIGURE 4 is a plan view of the intermediary body as seen from the opposite side.
Figure 5:
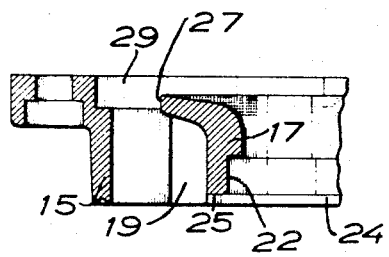
FIGURE 5 is an axial sectional view of the intermediary body taken on line V—V in FIGURE 3.

According to the invention, the diaphragm housing consists of two parts, viz., an intermediary body 15 shown in detail in FIGURES 3–5, and a lower body 16 in the shape of a ring of metal or synthetic plastic. The intermediary body constitutes a sleeve portion 17 which has a central through opening and is connected with the remaining intermediary body by webs 18 separated from each other by through openings 19 which widen toward their lower ends so that the sleeve portion 17 substantially is of mushroom-shape. The lower body 16 is secured to the underside of the intermediary body 15 with the aid of screws 20 and surrounds a connection socket 21 formed by the resonance horn and accommodated in a recess 22 in the sleeve portion 17 so that the inner side of said socket is flush with the inner side of said sleeve portion, while an annular flange 23 of the connection socket 21 is received in a recess 24 and is kept pressed by an annular rubber disk 26 against a shoulder 25 formed in the transition between the recesses 22 and 24, said rubber disk 26 being clamped against the intermediary body by the lower body 16 screwed thereonto. To permit the annular lower body to be passed over the flange 23 of the connection socket 21 the central opening of the lower body has a slightly greater diameter than the flange 23, whereas the central opening of the rubber disk 26 has a smaller diameter than said flange but can be passed because of its elasticity over said flange to be placed at the underside thereof.

The sleeve portion 17 constitutes a seat 27 against which is applied a diaphragm 28 which has the periphery clamped by means of the cover 14 against the bottom of an annular recess 29 around the seat 27, with the interposition of a resilient O-ring 30. The cover 14 is secured to the intermediary body with the aid of screws 31 and can be of metal in order to form together with the lower body a stiffening element for the interposed intermediary body of synthetic plastic. However, like the intermediary body and the lower body the cover may be made of synthetic plastic, which also applies to the resonance horn. In that case the cover and the lower body preferably consist of glass-fiber reinforced synthetic plastic to convey a stiffening effect to the intermediary body. The cover bears with pressure against the diaphragm at the periphery thereof, and at some points the bearing edge of the cover is penetrated by passageways 32, while passageways 32' are provided in the side of the intermediary body facing the cover in order that the diaphragm shall communicate on the side facing away from the seat with the atmosphere. The chamber which is defined in the housing by the intermediary body 15, the lower body 16 and the diaphragm 28 and which is formed by the openings 19 and the annular recess 29, is connected with an inlet 33 which in turn is connected with a pipe coupling 34 and contains a control valve 35, accessible from outside, for supplying a controlled amount of gaseous pressure medium, usually air under pressure. The intermittent communication of the chamber with the passage through the resonance horn 10 and the central through opening of the sleeve portion 17 during sound generation is controlled by means of the diaphragm bearing against the seat, said diaphragm being caused to vibrate by the pressure medium in the chamber when a predetermined pressure therein is reached, to give off sound through the resonance horn.

It is readily seen that the diaphragm oscillator described in the foregoing consists of relatively simple parts and that the most complicated of them, the intermediary body 15, which shall permit being manufactured with very precise dimensions, is of such a design as to be well suited for compression molding or injection molding with the use of relatively simple tools. The invention, however, is not limited to the embodiment described and shown but can be modified within the scope of the appended claim.

What I claim and desire to secure by Letters Patent is:

1. A pneumatic diaphragm oscillator, comprising an integral moulding consisting of a tubular wall flaring towards one end thereof, a peripheral wall spaced from and surrounding said tubular wall, webs spaced apart around said tubular wall extending between and integrally interconnecting said tubular wall and said peripheral wall, a cover spaced from the flaring end of said tubular wall and abutting said peripheral wall, a diaphragm, means for holding said cover against said peripheral wall and for clamping said diaphragm along its edge between said cover and said peripheral wall and biasing said diaphragm against the flaring end of said tubular wall, a resonance horn having an inlet end, means connecting said inlet end to the other end of said tubular wall, annular closure means surrounding said inlet end forming a seal between said inlet end and said peripheral wall, whereby said diaphragm, said tubular wall, said peripheral wall, and said annular closure means define a pressure gas inlet chamber, and inlet means for introducing pressure gas into said inlet chamber through said peripheral wall.

References Cited

UNITED STATES PATENTS

| | | | |
|---|---|---|---|
| 1,679,011 | 7/1928 | Widmyer | 116—142 |
| 1,742,380 | 1/1930 | Farmer | 116—142 |
| 1,747,049 | 2/1930 | Campbell | 116—142 |
| 2,579,784 | 12/1951 | Broden | 116—142 |
| 2,789,529 | 4/1951 | Broden | 116—142 |
| 2,944,509 | 7/1960 | Shintaku | 116—142 |
| 3,000,344 | 9/1961 | Ferrell | 116—142 XR |
| 3,207,123 | 9/1965 | Vrsaljko | 116—142 |

LOUIS J. CAPOZI, *Primary Examiner.*